United States Patent
Freund et al.

(10) Patent No.: US 8,298,443 B2
(45) Date of Patent: Oct. 30, 2012

(54) TUNABLE CONDUCTING POLYMER NANOSTRUCTURES

(75) Inventors: Michael S. Freund, Winnipeg (CA);
Bhavana A. Deore, Winnipeg (CA);
Insun Yu, Winnipeg (CA)

(73) Assignee: University of Manitoba, Winnipeg (CA)

( * ) Notice: Subject to any disclaimer, the term of this patent is extended or adjusted under 35 U.S.C. 154(b) by 465 days.

(21) Appl. No.: 12/161,235

(22) PCT Filed: Jan. 19, 2007

(86) PCT No.: PCT/CA2007/000078
§ 371 (c)(1),
(2), (4) Date: Jun. 16, 2010

(87) PCT Pub. No.: WO2007/082383
PCT Pub. Date: Jul. 26, 2007

(65) Prior Publication Data
US 2010/0270507 A1   Oct. 28, 2010

Related U.S. Application Data

(60) Provisional application No. 60/759,957, filed on Jan. 19, 2006.

(51) Int. Cl.
*H01B 1/12* (2006.01)
*C08G 79/08* (2006.01)
*C08G 75/00* (2006.01)
*C08F 28/06* (2006.01)
*C08F 26/06* (2006.01)

(52) U.S. Cl. ........ 252/500; 528/394; 528/380; 528/378; 528/379; 528/423; 526/256; 526/258

(58) Field of Classification Search .................. 252/500; 528/394, 380, 378, 379, 423; 526/256, 258
See application file for complete search history.

(56) References Cited

U.S. PATENT DOCUMENTS

| 4,820,595 | A  * | 4/1989  | MacDiarmid et al. ........ 429/405 |
| 5,281,363 | A  * | 1/1994  | Shacklette et al. ............ 252/500 |
| 6,737,504 | B2 * | 5/2004  | Freund et al. ................. 528/422 |
| 6,797,152 | B2   | 9/2004  | Freund et al. |
| 2002/0029979 | A1 | 3/2002 | Freund et al. |
| 2003/0055212 | A1 | 3/2003 | Freund et al. |
| 2011/0315932 | A1 * | 12/2011 | Freund et al. ................. 252/500 |

FOREIGN PATENT DOCUMENTS

| CA | 2548510 A1 | 6/2005 |
| WO | WO 02/10731 A1 | 2/2002 |
| WO | WO 03/011943 A1 | 2/2003 |

(Continued)

OTHER PUBLICATIONS

Bhavana et al. "Thermal Stability of High Molecular Weight Self-Doped Poly(anilineboronic acid)", Macromolecules, 2005, 38, 10022-10026.*

(Continued)

*Primary Examiner* — Robert S Loewe

(57) ABSTRACT

A method for producing a polymer comprising reacting a fluoride and a monomer having a boronic acid moiety, or a salt thereof, in acidic aqueous solution and/or in an aliphatic alcohol. Polymerization occurs with the addition of an oxidizing agent. The method may further comprise the step of purification of the polymer by centrifugation with 0.5 M HCl and/or dispersion of the polymer in a solvent. The polymer has a morphology tunable by changing the solvent.

18 Claims, 11 Drawing Sheets

FOREIGN PATENT DOCUMENTS

WO     WO 2005/054338 A1     6/2005

OTHER PUBLICATIONS

Leclerc et al. "Synthesis and Characterization of Poly(alkylanilines)", Macromolecules, 1989, 22, 649-653.*
H. Bracht, S. P. Nicols, W. Walukiewicz, J. P. Silveira, F. Briones, E. E. Haller, Nature 2000, 408, 69.
A. L. Briseno, S. Han, I. E. Rauda, F. Zhou, C.-S. Toh, E. J. Nemanick N. S. Lewis, Langmuir 2004, 20, 219.
B. C. Bunker, P. C. Rieke, B. J. Tarasevich, A. A. Campbell, G. E. Fryxell, G. L. Graff, L. Song, J. Liu, J. W. Virden, G. L. McVay, Science 1994, 264, 48.
S.-J. Choi, S.-M. Park, Adv. Mater. 2000, 12, 1547.
N.-R. Chiou, A. J. Epstein, Adv. Mater. 2005, 17, 1679.
C. R. Cooper, N. Spencer, T. D. James, Chem. Commun.1998, 1365.
B. A. Deore, I. Yu, M. S. Freund, J. Am. Chem. Soc. 2004, 126, 52.
B. A. Deore, I. Yu, P. M. Aguiar, C. Recksiedler, S. Kroeker, M. S. Freund, Chem. Mater. 2005, 17, 3803.
B. Deore, M. S. Freund, Analyst 2003, 128, 803.
K. Doblhofer, K. Rajeshwar, Handbook of Conducting Polymers; Marcel Dekker: New York, 1998; chap. 20.
P. J. Domaille, J. D. Druliner, L. W. Gosser, J. M. Read, Jr., E. R. Schmelzer, W. R. Stevens, J. Org. Chem. 1985, 50, 189.
A. J. Epstein, R. P. McCall, J. M. Ginder, A. G. Macdiarmid, In Spectroscopy of Advanced Materials; John Wiley & Sons: Chichester, UK, 1991.
J. H. Fendler, Chem. Mater, 1996, 8, 1616.
E. S. Forzani, H. Zhang, L. A. Nagahara, I. Amlani, R. Tsui, N. Tao, Nano Lett. 2004, 4, 1785.
V. Gupta, N. Miura, Electrochem. Commun. 2005, 7, 995.
H. He, J. Zhu, N. J. Tao, L. A. Nagahara, I. Amlani, R. Tsui, J. Am. Chem. Soc. 2001, 123, 7730.
H. X. He, C. Z. Li, N. J. Tao, Appl. Phys. Lett. 2001, 78, 811.
A. J. Heeger, Angew. Chem., Int. Ed. 2001, 40, 2591.
L. Huang, Z. Wang, H. Wang, X. Cheng, A. Mitra, Y. Yan, J. Mater. Chem. 2002, 12, 388.
J. Huang, R. B. Kaner, Nature Materials 2004, 3, 783.
J. Huang, S. Virji, B. H. Weiller, R. B. Kaner, Chem. Eur. J. 2004, 10, 1314.
J. Huang, S. Virji, B. H. Weiller, R. B. Kaner, J. Am. Chem. Soc. 2003, 125, 314.
J. Huang, R. B. Kaner, J. Am. Chem. Soc. 2004, 126, 851.
W.-S. Huang, B. D. Humphrey, A. G. MacDiarmid, J. Chem. Soc., Faraday Trans. 1986, 82, 2385.
J. Janata, M. Josowicz, Nature Materials 2003, 2, 19.
J. Kameoka, R. Orth, Y. Yang, D. Czaplewski, R. Mathers, G. W. Coates, H. G. Craighead, Nanotechnology 2003, 14, 1124.
D. H. Kim, K. F. Faull, A. J. Norris, C. D. Eckhert, J. Mass Spectrom. 2004, 39, 743.
D. H. Kim, B. N. Marbois, K. F. Faull, C. D. Eckhert, J. Mass Spectrom. 2003, 38, 632.
D. Kumar, R. C. Sharma, Eur. Polym. J. 1998, 34, 1053.
B. A. Deore, I. Yu, J. Woodmass, M. S. Freund, Macromol. Chem. Phys. 2008, 209, 1094.
D. Li, R. B. Kaner, Chem. Commun. 2005, 3286.
G. Li, C. Martinez, S. Semancik, J. Am. Chem. Soc. 2005, 127, 4903.
E. Lindner, V. V. Cosofret, S. Ufer, R. P. Buck, J. Chem. Soc., Faraday Trans. 1993, 89, 361.
H. Liu, J. Kameoka, D. A. Czaplewski, H. G. Craighead, Nano Lett. 2004, 4, 671.
J.-M. Liu, S. C. Yang, J. Chem. Soc., Chem. Commun. 1991, 1529.
Y. Long, Z. Chen, N. Wang, Y. Ma, Z. Zhang, L. Zhang, M. Wan, Appl. Phys. Lett. 2003, 83, 1863.
Y. Ma, J. Zhang, G. Zhang, H. He, J. Am. Chem. Soc. 2004, 126, 7097.
A. G. MacDiarmid, Angew. Chem. Int. Ed. 2001, 40, 2581.
A. G. MacDiarmid, Rev. Mod. Phys. 2001, 73, 701.
A. G. MacDiarmid, W. E. Jones, Jr., I. D. Norris, J. Gao, A. T. Johnson, Jr., N. J. Pinto, J. Hone, B. Han, F. K. Ko, H. Okuzaki, M. Llaguno, Synth. Met. 2001, 119, 27.
C. R. Martin, Chem. Mater. 1996, 8, 1739.
M. C. McAlpine, R. S. Friedman, S. Jin, K.-h Lin, W. U. Wang, C. M. Lieber, Nano Lett. 2003, 3, 1531.
D. T. McQuade, A. E. Pullen, T. M. Swager, Chem. Rev. 2000, 100, 2537.
J. C. Michaelson, A. J. McEvoy, J. Chem. Soc., Chem. Commun. 1994, 79.
A. Morrin, O. Ngamna, A. J. Killard, S. E. Moulton, M. R. Smyth, G. G. Wallace, Electroanalysis, 2005, 17, 423.
A. Morrin, F. Wilbeer, O. Ngamna, S. E. Moulton, A. J. Killard, G. G. Wallace, M. R. Smyth, Electrochem. Commun. 2005, 7, 317.
M. Nicolas, B. Fabre, G. Marchand, J. Simonet, Eur. J. Org. Chem. 2000, 9, 1703.
R. V. Parthasarathy, C. R. Martin, Chem. Mater. 1994, 6, 1627.
H. Qiu, M. Wan, J. Polym. Sci.: Part A: Polym. Chem. 2001, 39, 3485.
D. H. Reneker, I. Chun, Nanotechnology, 1996, 7, 216.
H. Sakai, R. Baba, K. Hashimoto, A. Fujishima, J. Phys . Chem. 1995, 99, 11896.
V. Saxena, B. D. Malhotra, Curr. Appl. Phys. 2003, 3, 293.
E. M. Scherr et al., Synth. Met., 1991,41, 735.
J. M. Schnur, Science, 1993, 262, 1669.
R. F. Service, Science 2001, 293, 782.
J. T. English, B. A. Deore, M. S. Freund, Sensors and Actuators B 2006, 115, 666.
H. Shirakawa, Angew. Chem. Int. Ed. 2001, 40, 2574.
E. Shoji, M. S. Freund, J. Am. Chem. Soc. 2001, 123, 3383.
E. Shoji, M. S. Freund, J. Am. Chem. Soc. 2002, 124, 12486.
E. Shoji, M. S. Freund, Langmuir 2001, 17, 7183.
A. Lodha, R. Singh, IEEE Trans. Semicond. Manufacturing 2001, 14, 281.
G. Socrates, Infrared Characteristic Group Frequencies. Tables and Charts, 2nd ed.; John Wiley & Sons: Chichester, UK, 1994.
J. Yan, G. Springsteen, S. Deeter, B. Wang, Tetrahedron 2004, 60, 11205.
S. Stafström, J. L. Brédas, A. J. Epstein, H. S. Woo, D. B. Tanner, W. S. Huang, A. G. MacDiarmid, Phys. Rev. Lett. 1987, 59, 1464.
J. Stejskal, P. Kratochvil, S. P. Armes, S. F. Lascelles, A. Riede, M. Helmstedt, J. Prokeš, I. Křivka, Macromolecules 1996, 29, 6814.
M. Trau, N. Yao, E. Kim, Y. Xia, G. M. Whitesides, I. A. Aksay, Nature 1997, 390, 674.
B. Vincent, J. Waterson, J. Chem. Soc., Chem. Commun. 1990, 683.
S. Virji, J. Huang, R. B. Kaner, B. H. Weiller, Nano Lett. 2004, 4, 491.
C. Wang, Z. Wang, M. Li, H. Li, Chem. Phys. Lett. 2001, 341, 431.
Z. Wei, M. Wan, T. Lin, L. Dai, Adv. Mater. 2003, 15, 136.
Z. Wei, Z. Zhang, M. Wan, Langmuir, 2002, 18, 917.
P. R. Westmark, L. S. Valencia, B. D. Smith J. Chromatogr. A 1994, 664, 123.
C.-G. Wu, T. Bein, Science 1994, 264, 1757.
F. Wudl, R. O. Angus, Jr., F. L. Lu, P. M. Allemand, D. J. Vachon, M. Nowak, Z. X. Liu, A. J. Heeger, J. Am. Chem. Soc. 1987, 109, 3677.
C. Y. Yang, P. Smith, A. J. Heeger, Y. Cao, J. E. Osterholm, Polymer 1994, 36, 1142.
Y. Yang, M. Wan, J. Mater. Chem. 2002, 12, 897.
H. Zhang, S. Boussaad, N. Ly, N. J. Tao, Appl. Phys. Lett. 2004, 84, 133.
X. Zhang, W. J. Goux, S. K. Manohar, J. Am. Chem. Soc. 2004, 126, 4502.
International Search Report and Written Opinion for PCT/CA2007/000078.
International Preliminary Report on Patentability for PCT/CA2007/000078.
Supplementary European Search Report and European Search Opinion for European Application No. 07 70 1706.
Examination Report for European Patent Application No. 07 70 1706 dated Jun. 15, 2011.
B. A. Deore, M. D. Braun, M. S. Freund, Macromol. Chem. Phys. 2006, 207, 660.
I. Yu, B. A. Deore, C. L. Recksiedler, T. C. Corkery, A. S. Abd-El-Aziz, M. S. Freund, Macromolecules 2005, 38, 10022.
B. A. Deore, M. S. Freund, Chem. Mater. 2005, 17, 2918.
C. L. Recksiedler, B. A. Deore, M. S. Freund, Langmuir 2005, 21, 3670.
B. A. Deore, S. Hachey, M. S. Freund, Chem. Mater. 2004, 16, 1427.

* cited by examiner

TUNABLE CONDUCTING POLYMER NANOSTRUCTURES

RELATED APPLICATION

This application is the national entry of PCT/CA2007/000078 filed Jan. 19, 2007, which claims priority from U.S. Ser. No. 60/759,957 filed Jan. 19, 2006.

FIELD OF THE INVENTION

The present invention relates to a method of producing a conducting polymer having a boronic acid moiety.

BACKGROUND OF THE INVENTION

The facile synthesis of nanometer-length scales as well as control over the dimensions of inorganic and organic material nanostructures is essential due to their unique size-dependent properties and promising potential applications in nanodevices, such as field-effect transistors,[1] sensor/actuator arrays,[2] optoelectronic devices,[3] and in biotechnology[4] (e.g., delivery agents for pharmaceutical agents) as well as catalytic and analytical systems.[5] Conducting polymers are a unique class of organic materials and are emerging as a promising material for synthesis of nanostructured materials and devices due to their electrical, electronic, magnetic, and optical properties.[6] Conducting polymers offer great prospect for practical applications[6, 7] which range from chemical and biological sensing and diagnosis to energy conversion and storage, light-emitting display devices, catalysis, drug delivery, separation, microelectronics, and optical storage due to their unparalleled architectural diversity and flexibility, low cost, and ease of synthesis. In recent years, conducting polymer-based[8] nanostructured materials in the shape of thin films and nanowires have attracted much attention for the construction of fast, inexpensive, and dimensionally appropriate devices.c[9]

Among all conducting polymers, polyaniline (PANi) is probably the most widely studied because it has a broad range of tunable properties derived from its structural flexibility. The doping level of PANi can be readily controlled through an acid/base dedoping process,[10] and it has high conductivity, good environmental stability and easy preparation. Different morphologies of PANi have been obtained through different synthesis or processing routes.[11] Low-dimensional nanostructures of PANi in various shapes and forms, for example, nanoparticles, nanowires, nanofibers, nanoshells, and nanotubes, have been produced.[12] Conducting PANi nanostructures are prime candidates for replacing conventional bulk materials in micro- and nanoelectronic devices[13] and in chemical[14] and biological[15,16] sensors, because they combine the properties of low-dimensional organic conductors with high surface area materials. Also, PANi nanostructures have metal-like and controllable conductivity as well as both thermal and environmental stability.

Synthesis of PANi one-dimensional (1-D) nanostructures has been carried out both chemically and electrochemically by polymerizing the aniline using templates,[16-18] surfactants,[19,20] liquid crystals,[21] thiolated cyclodextrins,[22] polyacids,[23] electrospinning,[24] mechanical stretching,[25] coagulating media,[26] interfacial polymerization,[12,14] seeding[27] and dilute polymerization.[28] Despite all of the progress in nanostructure synthesis, PANi's limitation in processibility continues to prevent it from fully reaching its practical potential. Especially for devices with features increasingly reducing in size, there is a pressing need for a practical method capable of reproducibly integrating PANi onto selected device structures with precision and control. Recently, Semancik et al.[13] demonstrated that PANi colloidal suspensions have excellent processability when applied electrophoretically.

Dispersion of this polymer is another interesting way to improve processability. Aqueous dispersions of PANi have been studied by many research groups using stabilizer surfactant,[29] and by controlling pH.[30] However, PANi nanostructure processability in common solvents is yet to be accomplished.

Aromatic boronic acids are known to bind compounds containing diol moieties such as carbohydrates, vitamins, coenzymes and ribonucleic acids with high affinity through reversible ester formation.[31] A similar reaction was used to achieve chemical[32] and electrochemical[33] polymerization of self-doped poly(anilineboronic acid) (PABA) through formation of an anionic boronic ester complex between 3-aminophenylboronic acid and D-fructose in the presence of fluoride. The equilibrium reaction of boronic acid with fluoride is also known to produce a tetrahedral anionic complex.[34] This is the source of fluoride-catalyzed polymerization of 3-aminophenylboronic acid under acidic conditions.[35] Fabre and co-workers[35] suggested that in the presence of fluoride, PABA is a self-doped polymer under acidic conditions. Similarly, aromatic boronic acids reversibly complex with aliphatic alcohols, the equilibrium constant for boronic acid-alcohol complex decreasing with increasing steric size of the alcohol i.e., methanol>ethanol>1-propanol.[36]

SUMMARY OF THE INVENTION

According to one aspect of the present invention, there is provided a method for producing a polymer comprising: reacting a fluoride and a monomer having a boronic acid moiety, or a salt thereof, in acidic aqueous solution and/or in an aliphatic alcohol; and polymerizing using an oxidizing agent.

According to another aspect of the present invention, there is provided a polymer produced by the method described herein.

According to a further aspect of the present invention, there is provided a dispersion comprising a polymer produced by the method described herein and a solvent.

BRIEF DESCRIPTION OF THE DRAWINGS

In the accompanying drawings, which illustrate an exemplary embodiment of the present invention.

DETAILED DESCRIPTION OF THE INVENTION

Figure 1:
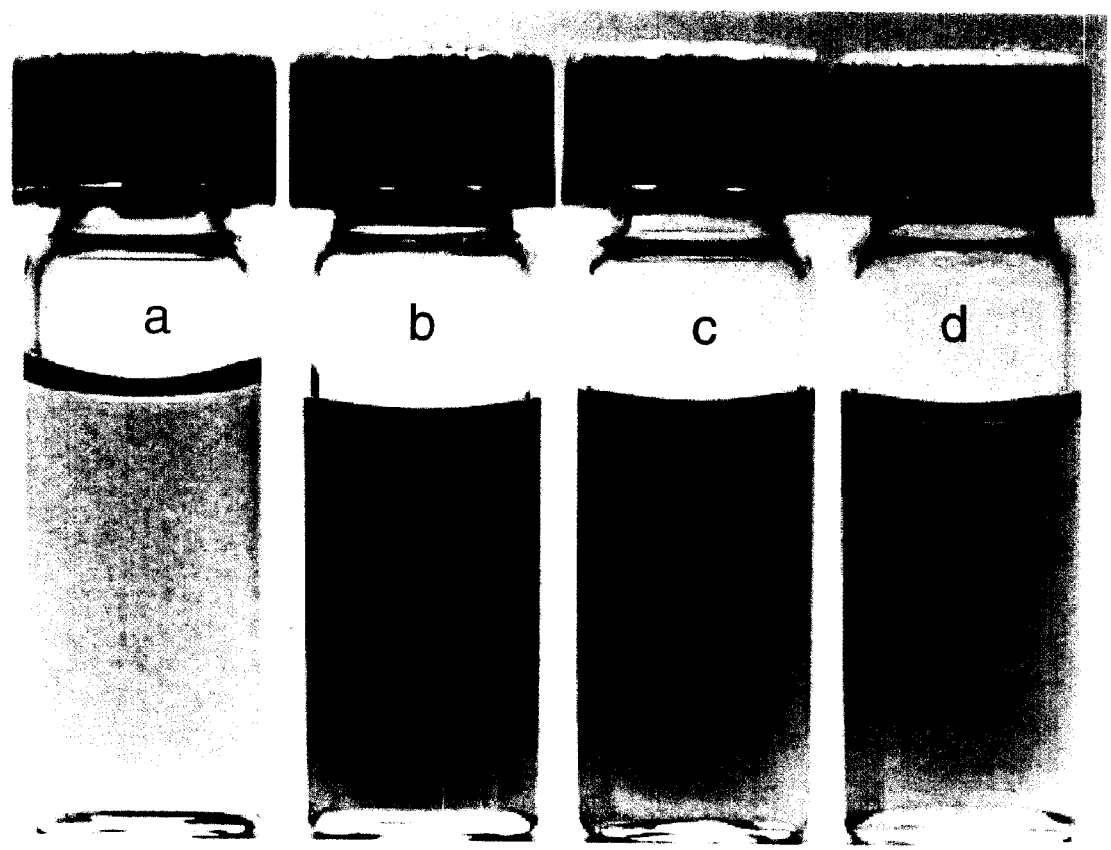
FIG. 1 depicts a photograph showing poly(anilineboronic acid) (PABA) nanostructures prepared in various solvents and, after purification, re-dispersed (40 mg/L) in the same solvent: (a) 0.1 M HCl, (b) methanol, (c) ethanol and (d) 1-propanol.

The invention relates to a method for producing a polymer comprising reacting a fluoride and a monomer having a boronic acid moiety, or a salt thereof, in acidic aqueous solution and/or in an aliphatic alcohol; and polymerizing using an oxidizing agent.

The monomer having a boronic acid moiety may be any monomer capable of forming a conducting polymer. For example, the monomer may be an aromatic boronic acid or salt thereof, such as a boronic acid substituted aniline, pyrrole or thiophene. In an embodiment, the monomer having a boronic acid moiety is 3-aminophenylboronic acid or a salt thereof, which results in a poly(anilineboronic acid) by the method of the present invention.

The fluoride may be, for example, sodium fluoride, lithium fluoride, or potassium fluoride.

The aliphatic alcohol may be, for example, methanol, ethanol, 1-propanol, isopropanol, butanol, or octanol.

The oxidizing agent may be, for example, ammonium persulfate, ferric chloride, potassium iodide, potassium dichromate, or potassium permanganate.

The method may further comprise the step of purifying the polymer, for example, by centifugation with 0.5 M HCl and/or the step of dispersing the polymer in a solvent.

The solvent in which the polymer is dispersed may or may not be the same solvent used during the polymerization step. The solvent may be an aliphatic alcohol such as methanol, ethanol, 1-propanol, isopropanol, butanol, or octanol, or an aqueous acid such as 0.1 M HCl.

The morphology of the polymer is tunable by changing the solvent. The morphology may be, for example, a nanoparticle, a nanofilm, a nanofiber, or a globular agglomerate network comprised of globules and fibers. Since the doping mechanism is the same for poly(anilineboronic acid), poly(pyrroleboronic acid) and poly(thiopheneboronic acid), the nanostructures of poly(pyrroleboronic acid) and poly(thiopheneboronic acid) may be formed by manipulating self-doping versus external doping similar to poly(anilineboronic acid).

The nanofilm is a smooth, uniform, transparent coating.

The particle size of the nanoparticle is tunable by varying the rate of polymerization. The particle size may be, for example, from about 2 to about 20 nm, from about 3 to about 20 nm, from about 4 to about 20 nm, from about 5 to about 20 nm, from about 6 to about 20 nm, from about 7 to about 20 nm, from about 8 to about 20 nm, from about 9 to about 20 nm, from about 10 to about 20 nm, from about 11 to about 20 nm, from about 12 to about 20 nm, from about 13 to about 20 nm, from about 14 to about 20 nm, from about 15 to about 20 nm, from about 16 to about 20 nm, from about 17 to about 20 nm, from about 18 to about 20 nm, from about 19 to about 20 nm, from about 2 to about 19 nm, from about 2 to about 18 nm, from about 2 to about 17 nm, from about 2 to about 16 nm, from about 2 to about 15 nm, from about 2 to about 14 nm, from about 2 to about 13 nm, from about 2 to about 12 nm, from about 2 to about 11 nm, from about 2 to about 10 nm, from about 2 to about 9 nm, from about 2 to about 8 nm, from about 2 to about 7 nm, from about 2 to about 6 nm, from about 2 to about 5 nm, from about 2 to about 4 nm, from about 2 to about 3 nm, from about 3 to about 19 nm, from about 4 to about 18 nm, from about 5 to about 17 nm, from about 6 to about 16 nm, from about 7 to about 15 nm, from about 8 to about 14 nm, from about 9 to about 13 nm, from about 10 to about 12 nm, from about 5 to about 15 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm, from about 2 to about 100 nm, from about 2 to about 90 nm, from about 2 to about 80 nm, from about 2 to about 70 nm, from about 2 to about 60 nm, from about 2 to about 50 nm, from about 2 to about 40 nm, from about 2 to about 30 nm, from about 10 to about 100 nm, from about 20 to about 100 nm, from about 30 to about 100 nm, from about 40 to about 100 nm, from about 50 to about 100 nm, from about 60 to about 100 nm, from about 70 to about 100 nm, from about 80 to about 100 nm, from about 90 to about 100 nm, from about 10 to about 90 nm, from about 20 to about 80 nm, from about 30 to about 70 nm, from about 40 to about 60 nm, about 30 nm, about 40 nm, about 50 nm, about 60 nm, about 70 nm, about 80 nm, about 90 nm, about 100 nm, 30 nm, 40 nm, 50 nm, 60 nm, 70 nm, 80 nm, 90 nm, or 100 nm.

The particulate size of the globular agglomerate network is tunable by varying the rate of polymerization. The particulate size may be, for example, from about 50 to about 80 nm, from about 55 to about 80 nm, from about 60 to about 80 nm, from about 65 to about 80 nm, from about 70 to about 80 nm, from about 75 to about 80 nm, from about 50 to about 75 nm, from about 50 to about 70 nm, from about 50 to about 65 nm, from about 50 to about 60 nm, from about 50 to about 55 nm, from about 55 to about 75 nm, from about 60 to about 70 nm, about 50 nm, about 55 nm, about 60 nm, about 65 nm, about 70 nm, about 75 nm, about 80 nm, 50 nm, 55 nm, 60 nm, 65 nm, 70 nm, 75 nm, 80 nm, from about 50 to about 500 nm, from about 50 to about 400 nm, from about 50 to about 300 nm, from about 50 to about 200 nm, from about 50 to about 100 nm, from about 100 to about 500 nm, from about 200 to about 500 nm, from about 300 to about 500 nm, from about 400 to about 500 nm, from about 100 to about 400 nm, from about 200 to about 300 nm, about 100 nm, about 200 nm, about 300 nm, about 400 nm, about 500 nm, 100 nm, 200 nm, 300 nm, 400 nm, or 500 nm.

The nanofiber has a diameter of, for example, from 15 to about 70 nm, from about 20 to about 70 nm, from about 25 to about 70 nm, from about 30 to about 70 nm, from about 35 to about 70 nm, from about 40 to about 70 nm, from about 45 to about 70 nm, from about 50 to about 70 nm, from about 55 to about 70 nm, from about 60 to about 70 nm, from about 65 to about 70 nm, from about 15 to about 65 nm, from about 15 to about 60 nm, from about 15 to about 55 nm, from about 15 to about 50 nm, from about 15 to about 45 nm, from about 15 to about 40 nm, from about 15 to about 35 nm, from about 15 to about 30 nm, from about 15 to about 25 nm, from about 15 to about 20 nm, from about 20 to about 65 nm, from about 25 to about 60 nm, from about 30 to about 55 nm, from about 35 to about 50 nm, from about 40 to about 45 nm, about 15 nm, about 20 nm, about 25 nm, about 30 nm, about 35 nm, about 40 nm, about 45 nm, about 50 nm, about 55 nm, about 60 nm, about 65 nm, about 70 nm, 15 nm, 20 nm, 25 nm, 30 nm, 35 nm, 40 nm, 45 nm, 50 nm, 55 nm, 60 nm, 65 nm, 70 nm, from 15 to about 200 nm, from 15 to about 150 nm, from 15 to about 100 nm, from 50 to about 200 nm, from 100 to about 200 nm, from 150 to about 200 nm, from 50 to about 150 nm, about 100 nm, about 150 nm, about 200 nm, 100 nm, 150 nm, or 200 nm.

The diameter of the nanofiber is tunable by changing the reaction time. The reaction time may be, for example, from about 5 to about 24 h, from about 6 to about 24 h, from about 7 to about 24 h, from about 8 to about 24 h, from about 9 to about 24 h, from about 10 to about 24 h, from about 11 to about 24 h, from about 12 to about 24 h, from about 13 to about 24 h, from about 14 to about 24 h, from about 15 to about 24 h, from about 16 to about 24 h, from about 17 to about 24 h, from about 18 to about 24 h, from about 19 to about 24 h, from about 20 to about 24 h, from about 21 to about 24 h, from about 22 to about 24 h, from about 23 to about 24 h, from about 5 to about 23 h, from about 5 to about 22 h, from about 5 to about 21 h, from about 5 to about 20 h, from about 5 to about 19 h, from about 5 to about 18 h, from about 5 to about 17 h, from about 5 to about 16 h, from about 5 to about 15 h, from about 5 to about 14 h, from about 5 to about 13 h, from about 5 to about 12 h, from about 5 to about 11 h, from about 5 to about 10 h, from about 5 to about 9 h, from about 5 to about 8 h, from about 5 to about 7 h, from about 5 to about 6 h, from about 6 to about 23 h, from about 7 to about 22 h, from about 8 to about 21 h, from about 9 to about 20 h, from about 10 to about 19 h, from about 11 to about 18 h, from about 12 to about 17 h, from about 13 to about 16 h, from about 14 to about 15 h, about 5 h, about 6 h, about 7 h, about 8 h, about 9 h, about 10 h, about 11 h, about 12 h, about 13 h, about 14 h, about 15 h, about 16 h, about 17 h, about 18 h, about 19 h, about 20 h, about 21 h, about 22 h, about 23 h, about 24 h, 5 h, 6 h, 7 h, 8 h, 9 h, 10 h, 11 h, 12 h, 13 h, 14 h, 15 h, 16 h, 17 h, 18 h, 19 h, 20 h, 21 h, 22 h, 23 h, or 24 h.

The nanofiber has a length of, for example, from about 400 nm to about 5.0 µm, from about 1.0 µm to about 5.0 µm, from about 1.5 µm to about 5.0 µm, from about 2.0 µm to about 5.0 µm, from about 2.5 µm to about 5.0 µm, from about 3.0 µm to about 5.0 µm, from about 3.5 µm to about 5.0 µm, from about 4.0 µm to about 5.0 µm, from about 4.5 µm to about 5.0 µm, from about 400 nm to about 4.5 µm, from about 400 nm to about 4.0 µm, from about 400 nm to about 3.5 µm, from about 400 nm to about 3.0 µm, from about 400 nm to about 2.5 µm, from about 400 nm to about 2.0 µm, from about 400 nm to about 1.5 µm, from about 400 nm to about 1.0 µm, about 400 nm, about 1.0 µm, about 1.5 µm, about 2.0 µm, about 2.5 µm, about 3.0 µm, about 3.5 µm, about 4.0 µm, about 4.5 µm, about 5.0 µm, 500 nm, 1.0 µm, 1.5 µm, 2.0 µm, 2.5 µm, 3.0 µm, 3.5 µm, 4.0 µm, 4.5 µm or 5.0 µm.

The polymer produced by the method described herein may be used in an electronic device, a battery or a sensor.

The present invention will now be described by referring to the accompanying figures with respect to an embodiment where the monomer having a boronic acid moiety is 3-aminophenylboronic acid.

3-Aminophenylboronic acid hydrochloride salt, anhydrous methanol and 1-propanol were purchased from Aldrich Chemical Inc. Sodium fluoride and pH 7.4 phosphate buffered saline stock solution (10×) were purchased from Fisher Scientific. Anhydrous ethanol was purchased from Commercial Alcohols Inc. Bulk distilled water was filtered then ion exchanged to yield 18.2 MΩ·cm quality water using Milli-Q-Academic A10™ (Millipore Corporation). TEM formvar-carbon coated copper grids (400 mesh) were purchased from Canemco-Marivac. Indium-doped tin oxide coated glass slides (ITO, 6+2 Ω/square) were purchased from Delta Technologies Ltd.

PABA nanostructures were synthesized using 10 mM 3-aminophenylboronic acid (monomer) and 50 mM sodium fluoride (NaF) in 20 mL 0.1 M HCl and anhydrous alcohols (methanol, ethanol and propanol) by adding 10 mM ammonium persulfate (oxidizing agent). Monomer with NaF and oxidizing agents were ground separately, and then oxidizing agent (ground powder) was added at once into the solution containing monomer and NaF. The mixture was stirred at room temperature and reaction was carried out for different time intervals in different solvents. The PABA nanostructures obtained were precipitated and then purified by centrifugation using 0.5 M HCl. Finally, the resulting nanostructures were rinsed with the corresponding solvents used during polymerization to remove traces of water and then re-dispersed in the same solvent. After removal of traces of water, nanostructures were easily re-dispersed into the solvent.

The morphologies of the nanostructures prepared from 3-aminophenylboronic acid were examined by Transmission Electron Spectroscopy (JEOL JEM-2000FX™). TEM samples were prepared by diluting the purified product and casting suspension on copper grids. UV-vis absorption spectra of nanostructure solution and films were obtained using an Agilent 8453 spectrophotometer. Fourier Transform-Infrared (FT-IR) spectra were obtained using a Nexus™ 870 spectrometer (Thermo Nicolet Corporation) equipped with an attenuated total reflectance (ATR) accessory. FTIR-ATR spectra of polymer powders were collected using a hemispherical Germanium optic crystal and a deuterated triglycine sulfate and thermo-electrically cooled (DTGS TEC) detector. One hundred interferograms were accumulated to obtain each FTIR-ATR spectrum at a spectral resolution of 8 cm$^{-1}$. Cyclic voltammetry (CV) measurements were performed using a CH Instrument CHI 660™ workstation. In the CV experiments, a three electrode configuration was used including a platinum wire (0.2 mm diameter) counter electrode, Ag/AgCl reference electrode, and glassy carbon as a working electrode. $^{11}$B NMR studies were carried out using a Bruker AMX 500 NMR spectrometer. The samples were prepared by adding 10% methyl-d$_3$-alcohol in the corresponding polymerization solvents. Chemical shifts were determined relative to borontrifluoride etherate as a reference. Conductivity measurements were carried out using a four-probe device on thin films prepared by dip coating using PABA nanostructure dispersions on glass slides. The thickness of films were approximately 100 nm calculated from CV oxidation peak currents. For thickness measurement, films were prepared on ITO glass slides with similar UV-vis absorbance as glass slides. Cyclic voltammograms were taken in 0.5 M HCl solution.

The dispersion of PABA nanostructures prepared in 0.1 M HCl generally remains stable with no precipitation observed for 1 day, while the dispersions of nanostructures prepared in alcohols are stable indefinitely (no precipitation was observed for solutions standing for greater than four months) with maximum concentration of 5 mg/mL (FIG. 1).

Figure 2:
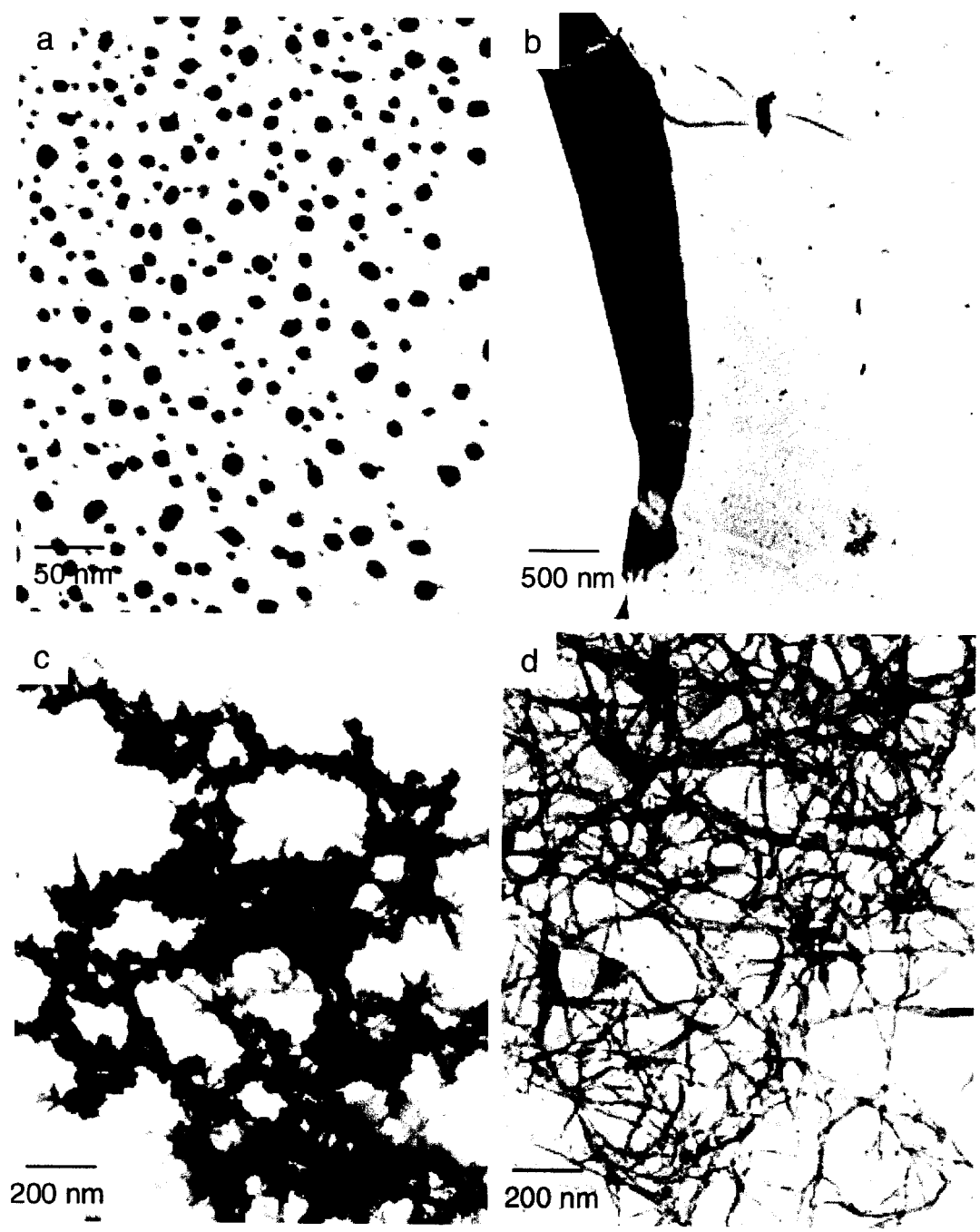
FIG. 2 depicts a transmission electron microscopy (TEM) image of PABA nanostructures prepared in various solvents and, after purification, re-dispersed (20 mg/L) in the same solvent: (a) 0.1 M HCl after 2 h, (b) methanol after 2 h, (c) ethanol after 5 h and (d) 1-propanol after 5 h.

In 0.1 M HCl solution, spherical nanoparticles with diameters in the range of 2-10 nm were obtained (FIG. 2). In contrast, alcohols such as methanol produce uniform transparent nanofilm. In ethanol, globular agglomerate network with 50-80 nm particulates, and in 1-propanol, well-defined nanofibers with average diameter about 15 nm, were obtained. The length of the nanofibers ranges from 400 nm up to several micrometers. The diameter of PABA nanofibers is tunable in the range of 15 to 70 nm by changing the reaction time from 5 to 16 h. The synthetic yield of the nanostructures ranged from 40-50 wt %. The amount of nanoparticles, nano globular agglomerates and nanofibers shown in FIG. 2a, c and d is virtually 100% of the isolated sample according to multiple TEM studies. In the case of methanol, throughout the grid a uniform transparent nanofilm was observed in multiple measurements suggesting that PABA is soluble under these conditions (2 mg/ml). This was further supported by the fact that the solutions were easily passed through 0.02-µm filters. Heat treatment of the nanofibers results in crosslinking to form smooth and continuous films in a manner similar to recent reports on flash welding.[44]

Figure 3A:
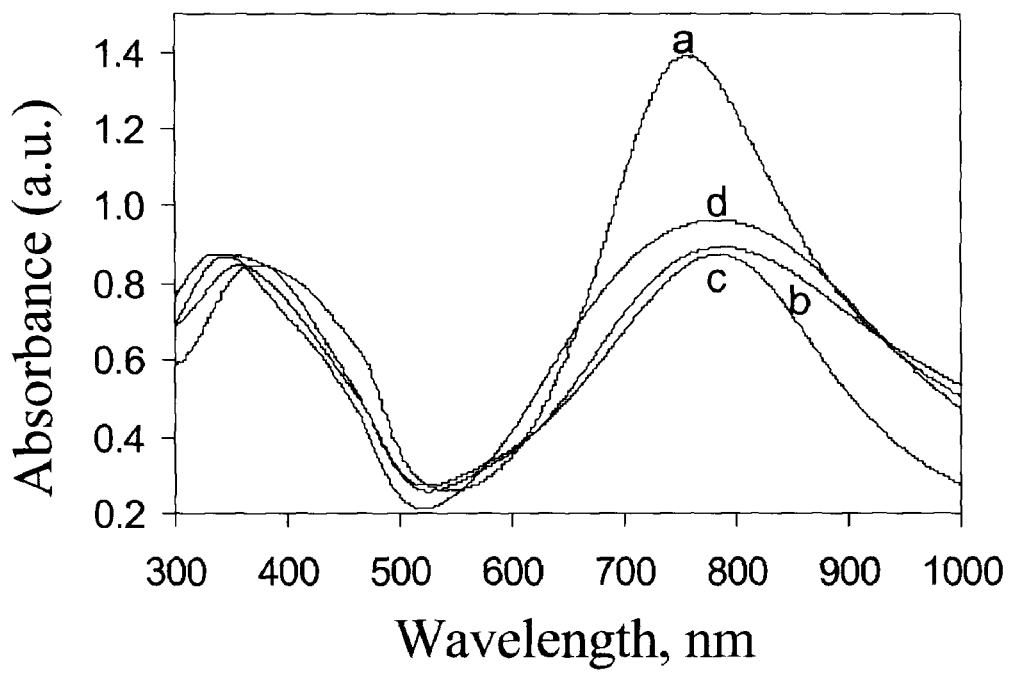
FIG. 3 depicts an UV-vis spectrum of (A) PABA nanostructures prepared in various solvents and (B) thin films prepared by dip coating from various solvents, wherein PABA nanostructures were prepared in the various solvents and, after purification, re-dispersed in the same solvent: (a) 0.1 M HCl (b) methanol (c) ethanol, (d) 1-propanol and (e) following the exposure of 'd' to pH 7.4 phosphate-buffered solution (PBS) for an hour.
Figure 3B:
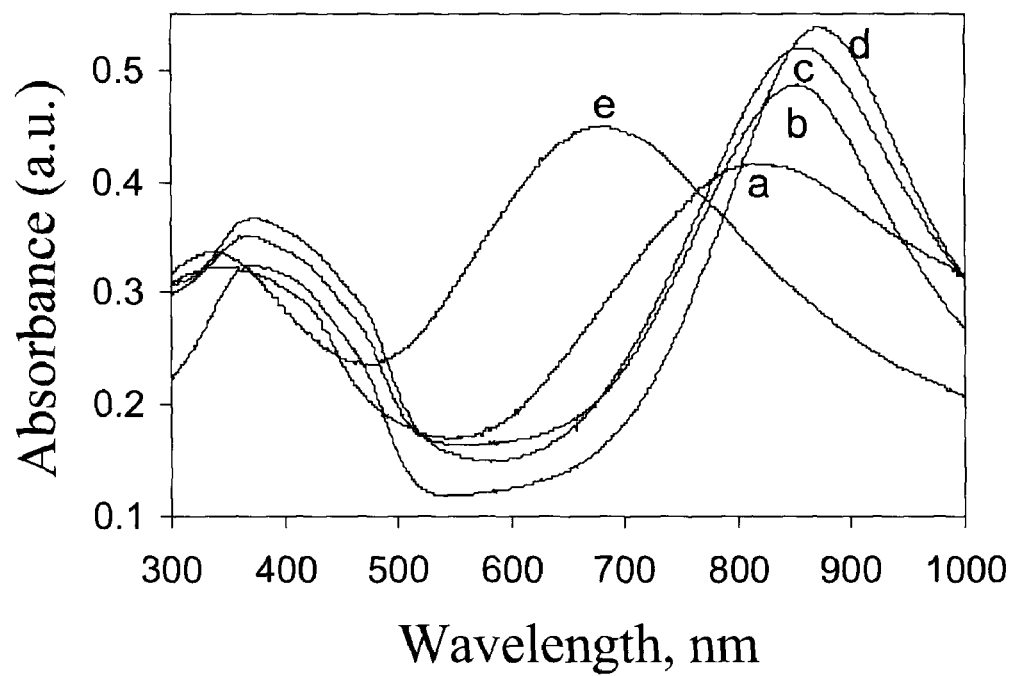

UV-vis spectra of PABA nanostructures prepared and then re-dispersed in the same polymerization solvents (FIG. 3A) show that they are in the emeraldine oxidation state with peak centered on 320 and 800 nm. The characteristic absorption bands are due to π-π* and bipolaron band transitions, respectively.[37] The shoulder observed near 420 nm is due to the polaron band.[37] The presence of these bands in 0.1 M HCl (FIG. 3A, a) and alcohol dispersions (FIG. 3A, b-c) indicate that the nanostructures are in the conducting, doped state. The UV-vis spectra of films prepared from nanostructure films are same as their dispersions except 80 nm red shift in the bipolaron band. This shift at higher wavelength likely occurs due to intermolecular crosslinking between boronic acid groups and/or boronic acid and secondary amines on the PANi backbone. Dedoped PABA is obtained upon exposure to pH 7.4 PBS. The blue shift in the bipolaron band of PABA nanostructures from 800 to 620 nm (FIG. 3B, e) is observed due to removal of dopant and conversion from salt into the dedoped base form.[32] The four-probe conductivity of these nanostructured thin films on the glass substrate is shown in Table 1. The conductivity of PABA nanosructured film prepared in 0.1 M HCl and alcohols is about 15 and 2 S/cm, respectively. These conductivity values are similar to conventional emeraldine/HCl powder.[8]

TABLE 1

Conductivity of PABA nanostructured thin films prepared from dispersions in different solvents.

| Solvents | Conductivity (S/cm) |
|---|---|
| 0.1 M HCl | 15 |
| Methanol | 2.0 |
| Ethanol | 1.8 |
| 1-Propanol | 1.7 |

Figure 4:
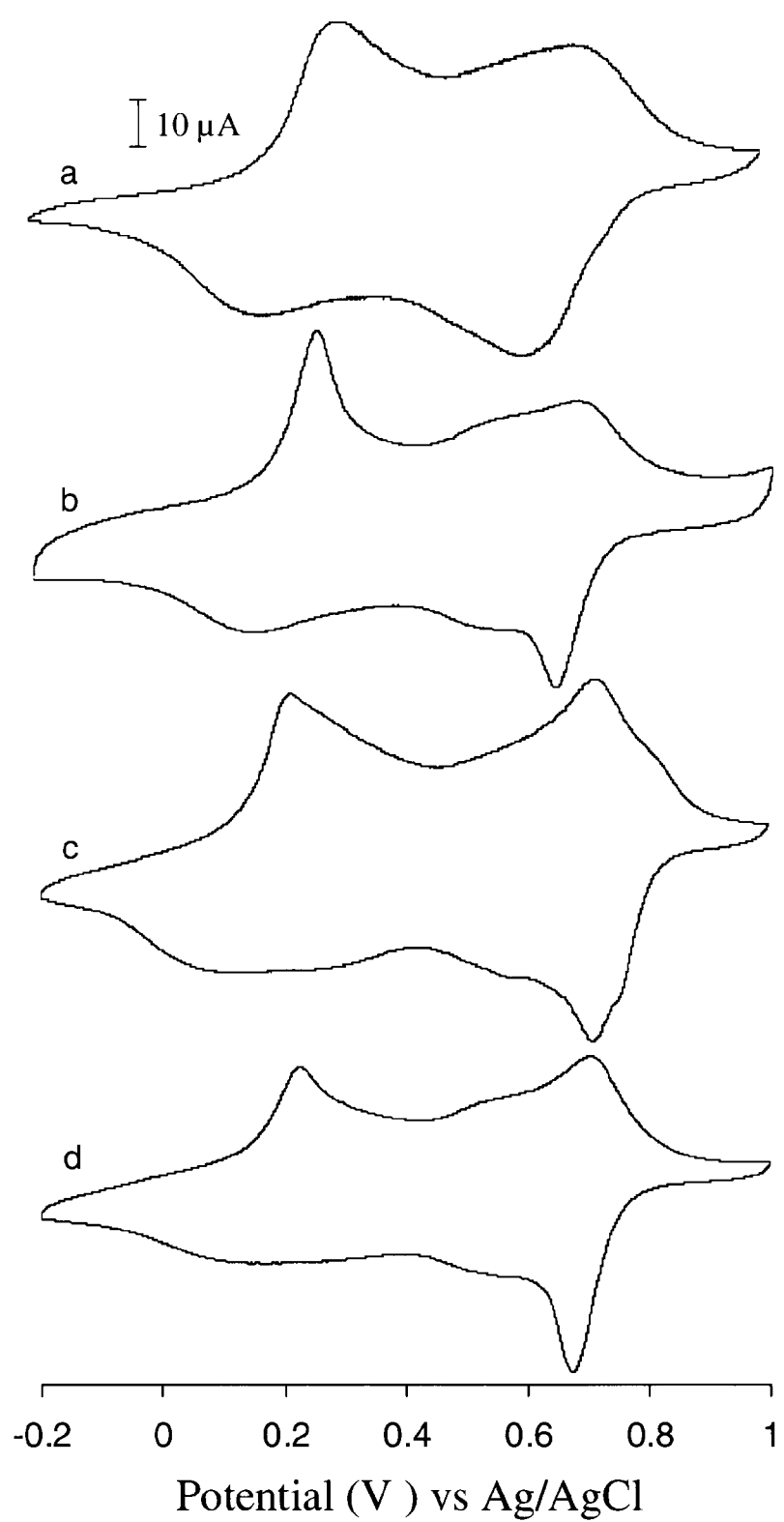
FIG. 4 depicts cyclic voltammograms (CV) of PABA nanostructures coated onto glassy carbon electrodes in 0.5 M HCl, wherein PABA nanostructures were prepared in various solvents and, after purification, re-dispersed in the same solvent: (a) 0.1 M HCl (b) methanol (c) ethanol, (d) 1-propanol.

The redox behavior of PABA nanostructures in 0.5 M HCl is shown in FIG. 4. Two sets of redox peaks at ~0.20 and 0.65 V are observed due to the facile conversion between oxidation states.[10] The redox properties for all forms of PABA nanostructure (FIG. 4, a-d) are similar to unsubstituted PANi[10] and previously reported chemically and electrochemically prepared PABA under acidic conditions in the presence of fluoride.[38]

Figure 5:
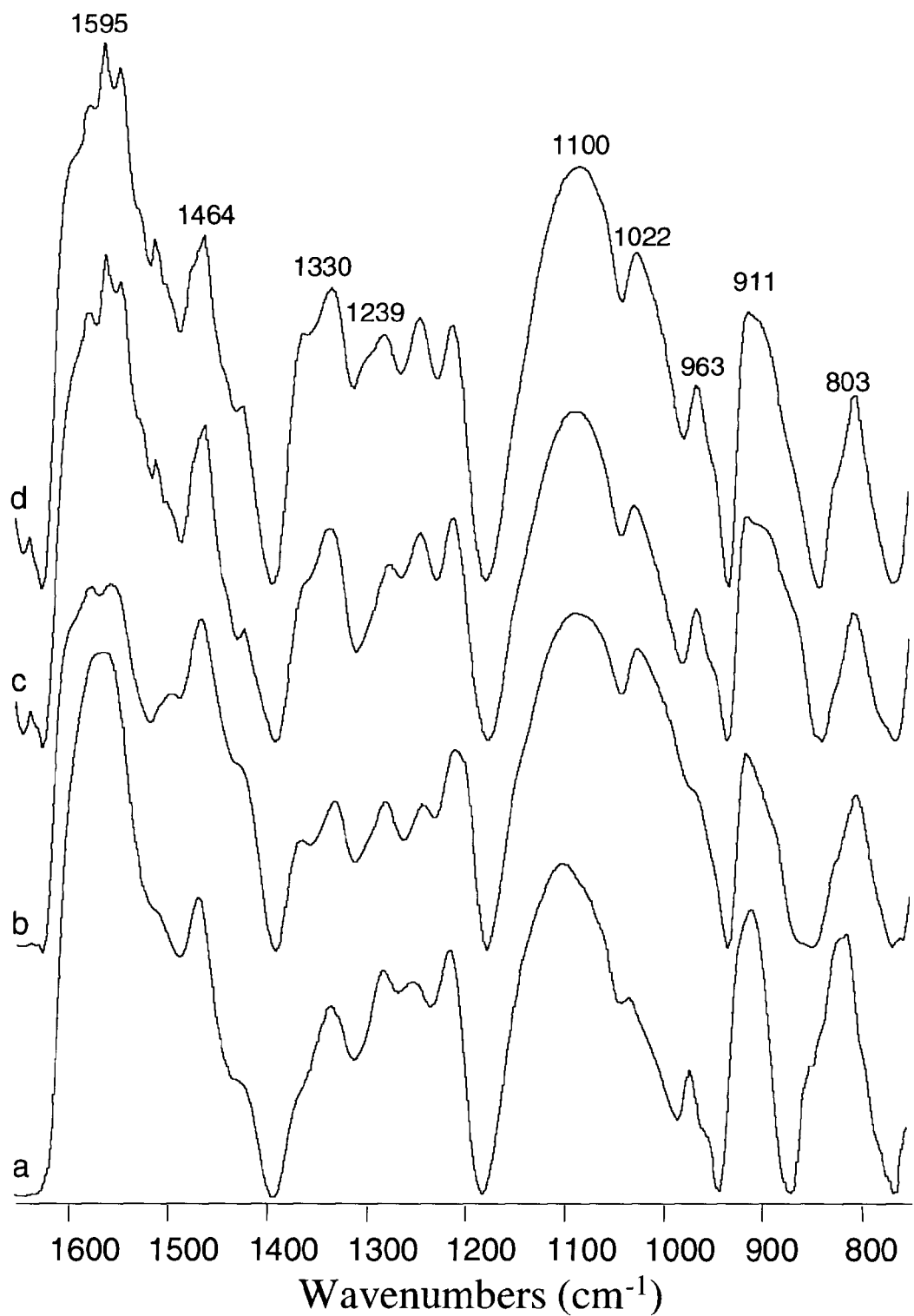
FIG. 5 depicts a Fourier-transform infrared attenuated total reflectance absorption spectra of PABA prepared in various solvents and, after purification, re-dispersed in the same solvent: (a) 0.1 M HCl (b) methanol (c) ethanol, (d) 1-propanol, wherein the samples were dried and spectra were taken of dry powder.

The FTIR-ATR spectra of PABA nanostructures prepared in 0.1 M HCl and alcohols are similar. FIG. 5 shows the FTIR-ATR spectrum of PABA nanostructures prepared in 1-propanol. This is a typical spectrum of chemically prepared PABA,[32, 39] which indicates that the dark green product obtained is PABA produced from monomer in alcohols. IR bands characteristic of PANT are observed at 1595, 1464 and 1100 cm$^{-1}$ corresponding to quinoid, benzinoid and the aromaic C-N stretching ring modes.[40] The characteristic bands of the boronic acid functional group are observed at 1022 as well as 963 and 808 cm$^{-1}$, assigned to aromatic B-OH bending and the B-F stretching modes, respectively.[41] The asymmetric B-0 stretching mode is observed at 1330 cm$^{-1}$. The ratio of the relative intensities of quinoid to benzenoid ring modes ($I_{1603}/I_{1510}$) is >1.5, which suggests that the percentage of imine units is higher than that of amine units. These results indicate that the nanostructures are in an oxidized conducting form of the polymer.

Figure 6:
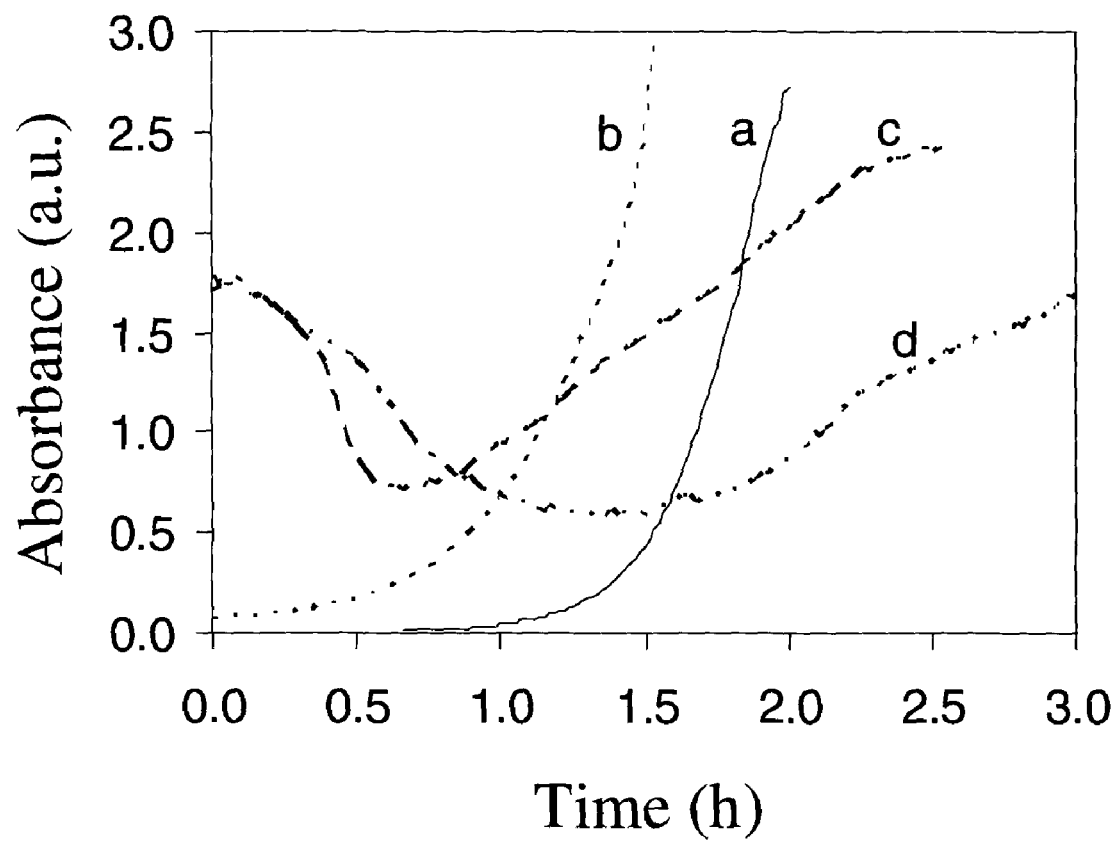
FIG. 6 depicts a graph of the polymerization kinetics of 3-aminophenylboronic acid (3-APBA) monitored with UV-vis at 800 nm in (a) 0.1 M HCl (b) methanol (c) ethanol and (d) 1-propanol.

The reason for different reaction times is a result of the solubility of the oxidizing agent in different solvents and subsequently the rate of polymerization. UV-vis kinetics of the polymerization process monitored at 800 nm in different solvents is shown in FIG. 6. Monomer and sodium fluoride are soluble in all of the solvents. The oxidizing agent is soluble in 0.1 M HCl and methanol, however only partially soluble in ethanol and 1-propanol (ethanol>1-propanol). Therefore, in the case of ethanol and 1-propanol, the initial absorbance of reaction mixture is high due to the scattering of light by the suspended oxidant particles (~100-150 nm). The rate of polymerization decreases in the series of methanol>0.1 M HCl>ethanol>1-propanol. Clearly, in the cases where the oxidant is completely soluble, i.e., in 0.1 M HCl and methanol, the rate of polymerization is faster compared to ethanol and 1-propanol. However, the rate of polymerization is higher in methanol compared to 0.1 M HCl, likely due to the fact that the product is soluble in methanol. Aromatic boronic acids are known to complex reversibly with aliphatic alcohols, where the equilibrium constant for boronic acid-alcohol complex decreases with increase in steric size of the alcohol, i.e., methanol>ethanol>1-propanol.[36] In order to explore the role of alcohols in polymerization, $^{11}$B NMR of monomer and polymer solutions in alcohols were obtained.

Figure 7:
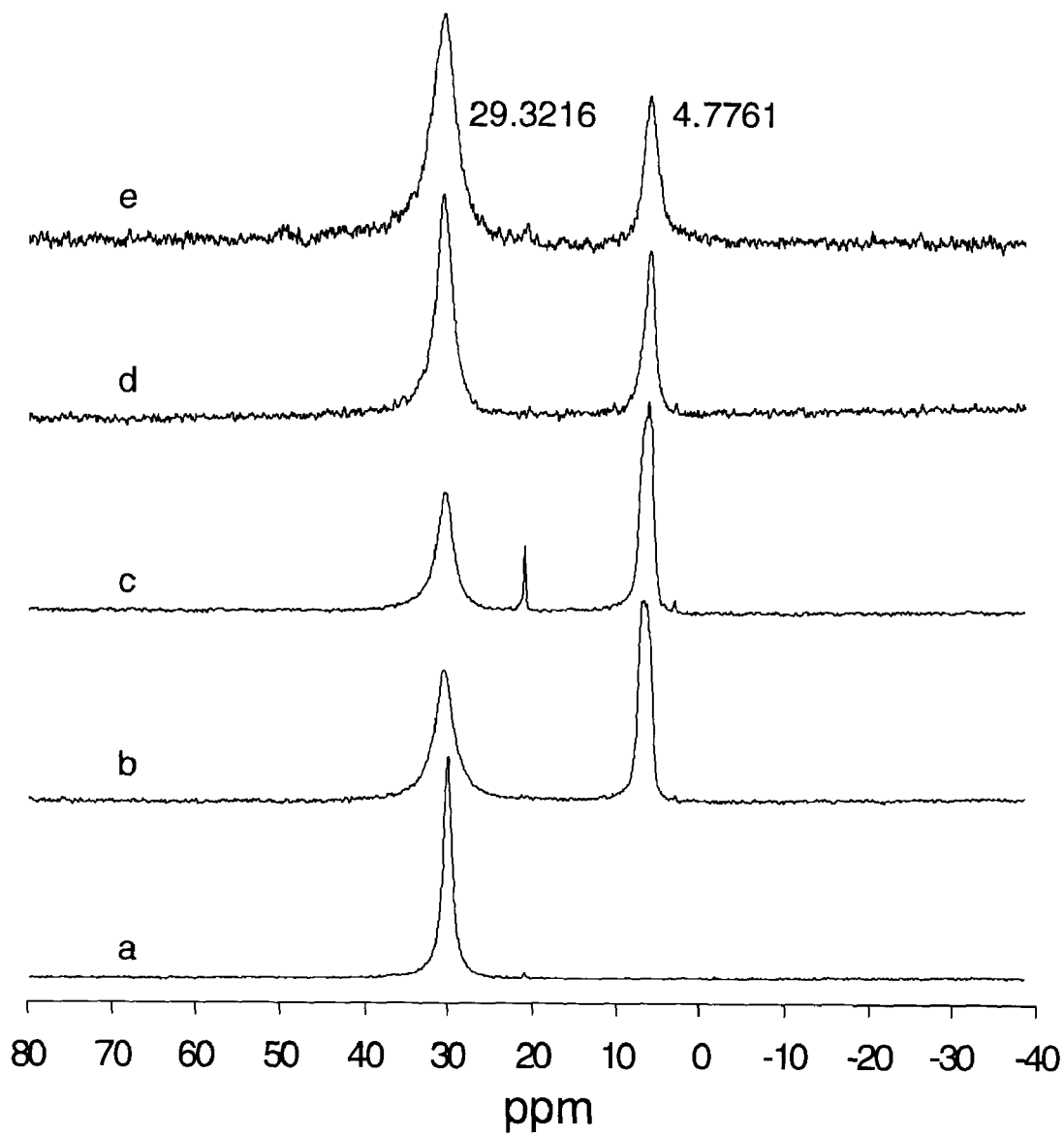
FIG. 7 depicts $^{11}B$ NMR spectra of monomer (a) 10 mM 3-APBA in methanol, (b) 10 mM 3-APBA+50 mM NaF in methanol, and PABA nanostructures prepared using 10 mM 3-APBA+50 mM NaF+10 mM $(NH_4)_2S_2O_8$ in (c) methanol, polymerization time–2 h, (d) ethanol, 4 h and (e) 1-propanol, 4 h, wherein $^{11}B$ NMR spectra were taken under polymerization conditions.

It is known that the chemical shift of the $^{11}$B NMR signal from boronic acids is dependent on the hybridization state of the boron atom (trigonal versus tetrahedral). FIG. 7 shows the $^{11}$B NMR spectrum of monomer and polymer in the alcohols. In the case of monomer in methanol (FIG. 7a), a single resonance is observed with a chemical shift at 29.3 ppm, which indicates that the major boronic acid species exists in the neutral trigonal form[36] as shown in Scheme 1(II and III).

sample) together with film are observed (FIG. 8c), which self-assemble after purification (FIG. 2c). However, in case of

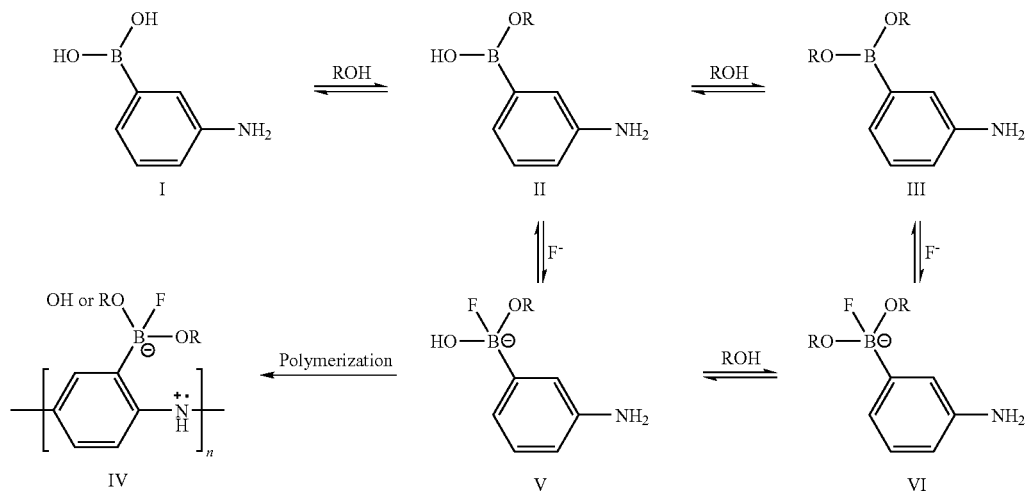

Scheme 1. Proposed mechanism of 3-APBA-aliphatic alcohol complexation and polymerization.

However, in the presence of sodium fluoride (FIG. 7b), an additional resonance signal is observed approximately 25 ppm upfield from the trigonal boronic acid signal, indicative of the formation of tetrahedral anionic boronic acid[31] as shown in Scheme 1(IV). The presence of two peaks indicates the slow exchange between the two forms on the $^{11}$B NMR time scale.[42] In the methanol solution containing monomer and sodium fluoride, oxidizing agent was added and $^{11}$B NMR spectrum was taken after 2 h polymerization reaction (see FIG. 7c). Similarly, polymerization reactions were carried out in ethanol and 1-propanol and $^{11}$B NMR spectra were taken after 4 h (see FIGS. 7d and e). In all three alcohols, additional resonance is observed approximately 25 ppm upfield from trigonal boronic acid signal, indicative of the formation of a tetrahedral anionic boronic acid as shown in Scheme 1(V). However, the ratio of tetrahedral to trigonal boronic acid decreases with a decrease in solvent polarity. In methanol, 55% of the boronic acid is tetrahedral, however, in ethanol and 1-propanol, the amount of tetrahedral boronic acid is 34 and 27%, respectively. These results suggest that the alcohols are complexing with monomer based on size of alcohol, and in presence of fluoride, monomer-alcohol complex is converted to an anionic boronate ester, which forms the basis of self-doped PABA in alcohols. However, the self-stabilization of PABA is dependent on solvent polarity and its ability to stabilize charge.

Figure 8:
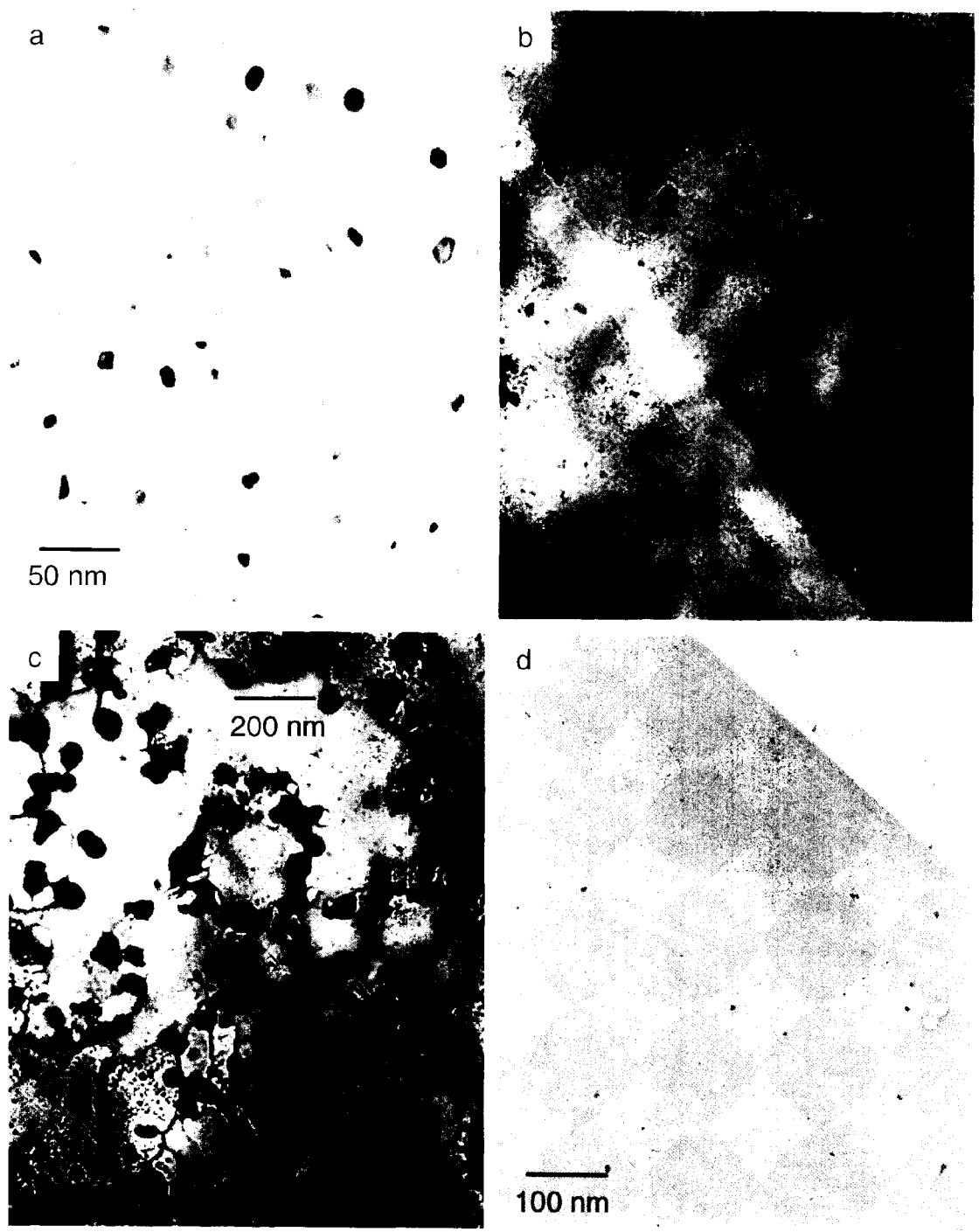
FIG. 8 depicts TEM images of PABA nanostructures during polymerization in (a) 0.1 M HCl after 2 h, (b) methanol after 2 h, (c) ethanol after 5 h and (d) 1-propanol after 5 h, wherein the TEM samples were prepared by diluting the polymerization solution in the corresponding solvent.

To elucidate the relative importance of the polymerization conditions versus the purification/dispersion conditions on the nanostructure produced, TEM studies were carried out without purifying the sample with 0.5 M HCl. After polymerization, samples were immediately diluted with the corresponding polymerization solvent, cast onto TEM grids, and dried in air to quench the polymerization. TEM images of polymer prepared in alcohols are given in FIG. 8. The morphology of PABA prepared in 0.1 M HCl and methanol is similar before and after purification. In the case of 0.1 M HCl, before purification, 2-20 nm diameter nanoparticles are observed (FIG. 8a). In methanol (FIG. 8b), no discernable nanostructures are seen except a thick film on the grids. In ethanol, 50-60 nm diameter particles (around 40% of the total 1-propanol (FIG. 8d), a uniform nanofilm is observed over the entire TEM grid. The morphology is completely different than that observed following purification (see FIG. 2d). This result suggests that the nanofibers are not formed during polymerization in 1-propanol. They are likely formed once the polymer is re-dispersed in the 1-propanol after purification with 0.5 M HCl. Before purification, PABA in 1-propanol was easily passed through a 0.02-mm filter, however after purification with 0.1 M HCl, PABA re-dispersed in 1-propanol was not able to pass through a filter presumably due to the formation of the nanostructures. The solubility of PABA in methanol and 1-propanol and partially ethanol during polymerization is observed, likely due to self-stabilization through self-doping.[32]

In 0.1 M HCl, PABA nanoparticles are likely formed due to suppression of secondary growth[43] and controlled growth by dilute polymerization. There are no reports describing the formation of conducting nanoparticles of any kind of polymer with dimension in the range of 5-15 nm without using surfactant or stabilizers as a template.

Figure 9:
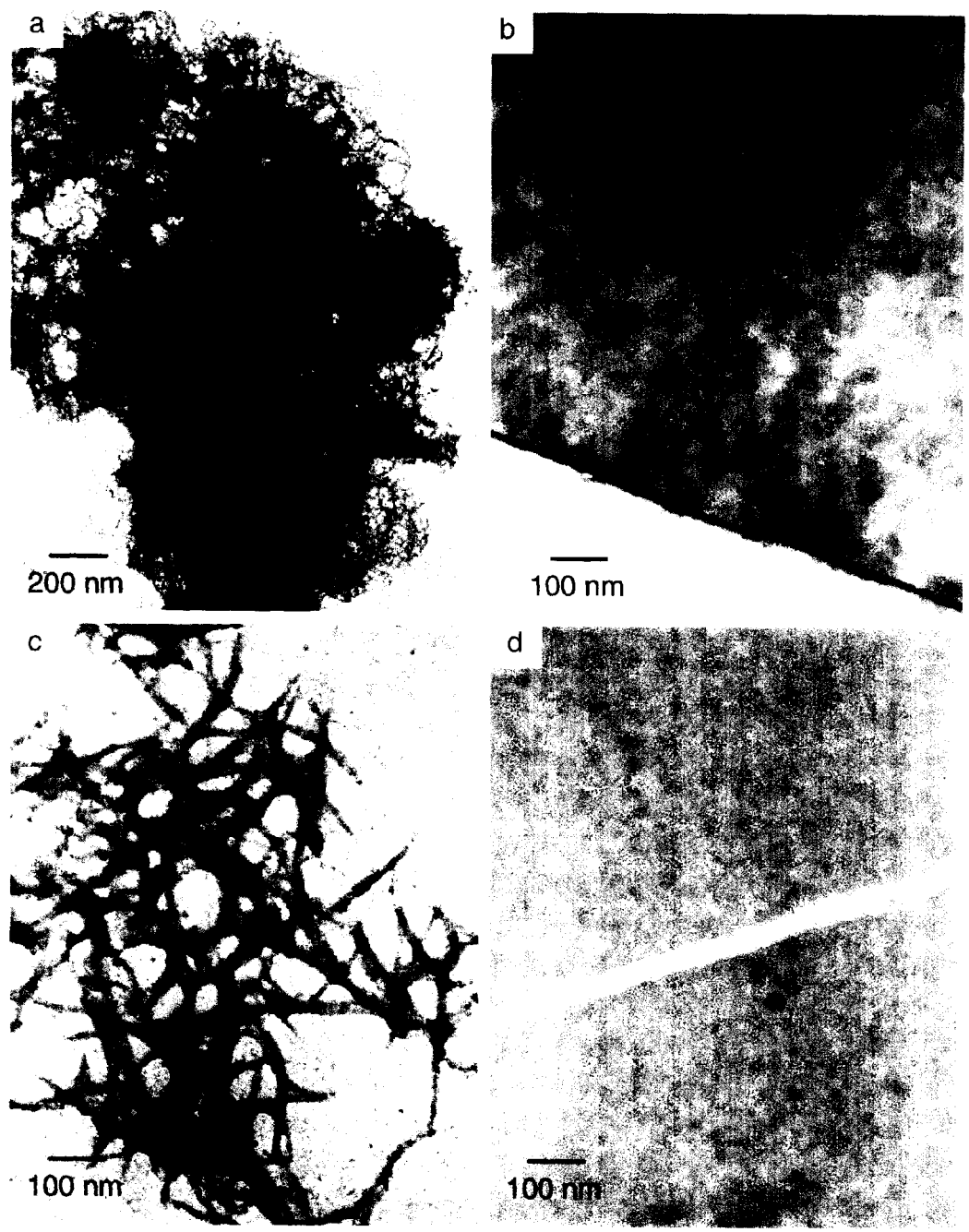
FIG. 9 depicts TEM images of PABA nanostructures prepared in (a) 0.1 M HCl, (b) methanol, (c) ethanol and re-dispersed in 1-propanol and (d) prepared in 1-propanol and re-dispersed in methanol.

The reason for fibrillar morphology in 1-propanol after HCl washing remains unclear. In order to investigate the role of solvent, nanostructures prepared in 0.1 M HCl and alcohols were re-dispersed into 1-propanol rather than the solvent used for polymerization. FIG. 9a-c show the TEM images of PABA nanostructures prepared in 0.1 M HCl, methanol and ethanol and after purification re-dispersed into 1-propanol. In the case of methanol, a spongy film is formed on the grid. In contrast, in 0.1 M HCl and ethanol, fibrillar morphology is observed; however, size of the fibers is different in each solvent. Similarly, polymer prepared in 1-propanol shows no morphological structure in the methanol (see FIG. 9d). These results suggest that the three factors i.e., polymerization solvent, purification with HCl, and re-dispersion in 1-propanol are important in the production of well-defined, relatively long nanofibers with average diameter around 15 nm.

Figure 10:
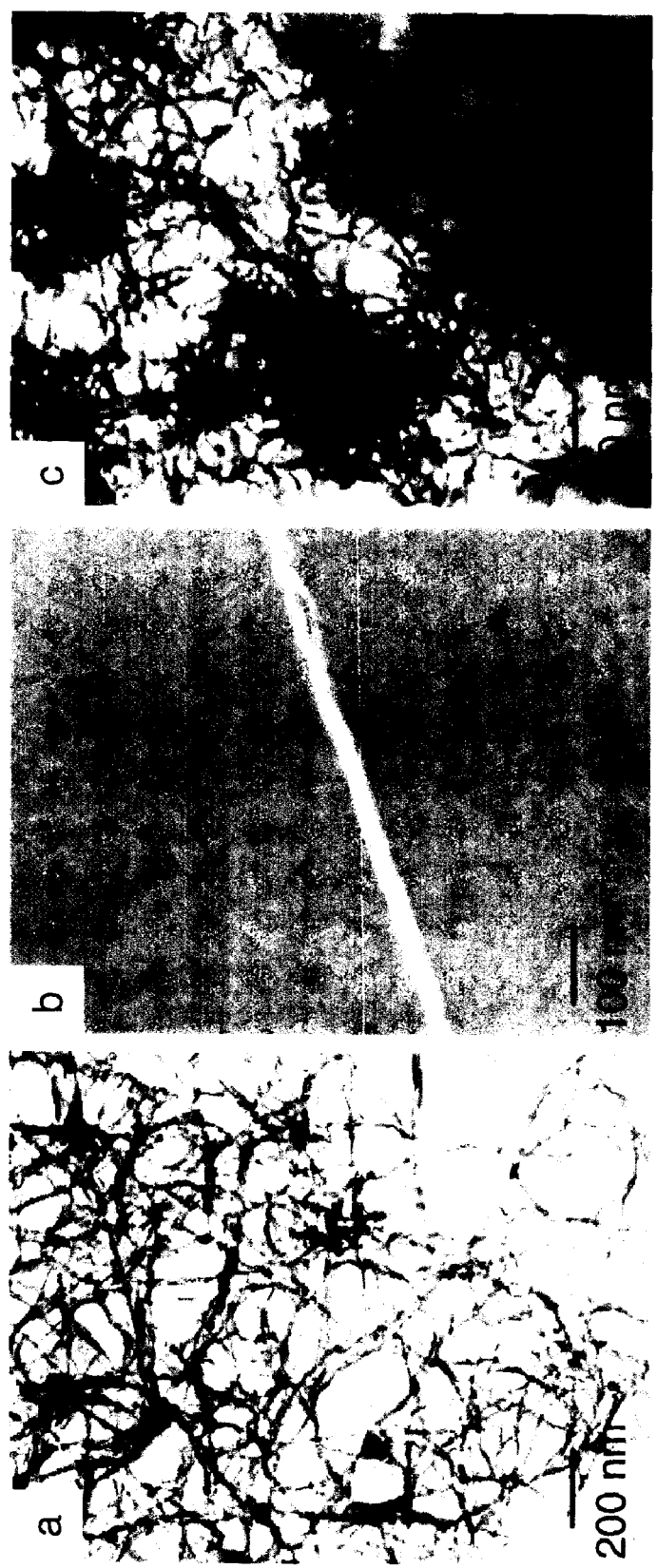
FIG. 10 depicts TEM images of PABA nanostructures (a) prepared in 1-propanol and re-dispersed in 1-propanol (b) 1-propanol dispersion washed with 0.5 M HCl and re-dispersed in methanol, and (c) methanol dispersion washed with 0.5 M HCl and re-dispersed in 1-propanol.

The reproducible formation of fibers in 1-propanol after purification with HCl is shown in FIG. 10. The polymer prepared and purified using HCl was re-dispersed in 1-propanol, isolated again with HCl and re-dispersed in methanol.

The morphology changes dramatically from fibers to a featureless film (see FIGS. 10a and b). However, when the same methanol dispersion was isolated again with HCl and redispersed in 1-propanol, fibrillar morphology reappeared (see FIG. 10c). These results clearly indicate that the fibers are formed when HCl doped PABA is dispersed in a less polar solvent.

Figure 11:
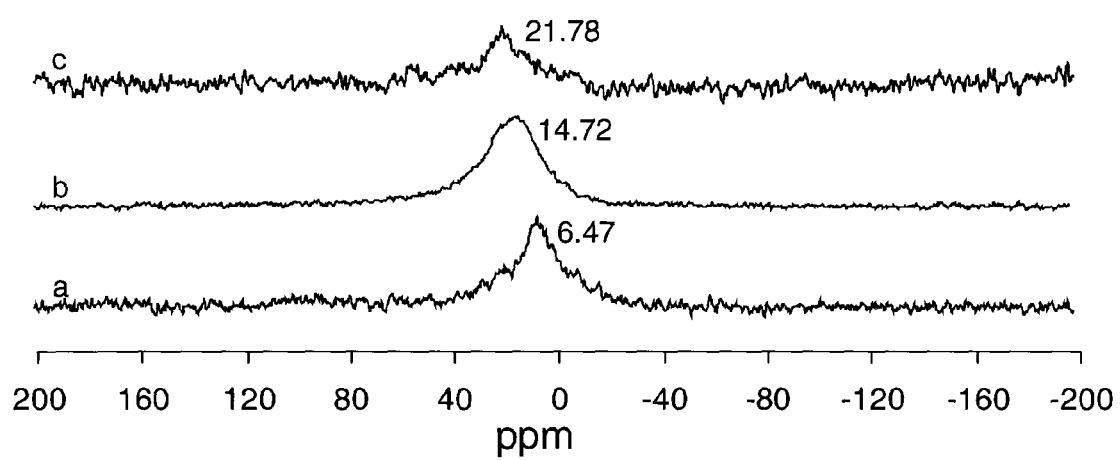
FIG. 11 depicts $^{11}B$ NMR spectra of PABA nanostructures dispersed in various solvents, wherein the PABA nanostructures were prepared in the various solvents and, after purification, redispersed in the same solvent: (a) methanol (b) ethanol, and (c) 1-propanol.

The role of the purification step is also important in the synthesis of these nanostructures. Based on $^{11}$BNMR results, PABA is self doped under the polymerization conditions. Following purification with 0.5 M HCl, the spectra indicate the formation of tetrahedral ester in methanol and trigonal ester in ethanol and 1-propanol (FIG. 11), suggesting that in the process, fluoride is exchanged by chloride and as a result PABA is in a nonself-doped conducting state when dispersed in ethanol and 1-propanol. However, in the case of methanol, PABA is in a self-doped state and soluble even after purification with 0.5 M HCl due to higher binding capacity of methanol. Re-dispersion of HCl doped PABA shows aggregation of globules with small fibrils in ethanol and well-defined fibrillar morphology in 1-propanol due to aggregation. This aggregation is clearly dependant on the relative complexing capacity of boronic acid with alcohols, which in turn impacts the stabilization of nanostructures in the solvent. It is also expected that the polymerization solvent plays an important role in determining the nanostructure. In particular, the molecular weight of PABA prepared in 0.1 M HCl and alcohols is likely different due to different rates of polymerization. In turn, aggregation of different molecular weight PABA would likely result in different size fibers in 1-propanol.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. In the claims, the word "comprising" is used as an open-ended term, substantially equivalent to the phrase "including, but not limited to".

REFERENCES

1. M. C. McAlpine, R. S. Friedman, S. Jin, K.-h Lin, W. U. Wang, C. M. Lieber, *Nano Lett.* 2003, 3, 1531.
2. E. Lindner, V. V. Cosofret, S. Ulfer, R. P. Buck, *J. Chem. Soc. Faraday Trans.* 1993, 89, 361; H. Sakai, R. Baba, K. Hashimoto, A. Fujishma, *J. Phys. Chem.* 1995, 99, 11898.
3. M. Trau, N. Yao, E. Kim, Y. Xia, G. M. Whitesides, I. A. Akshay, *Nature* 1997, 390, 674; J. H. Fendler, *Chem. Mater.* 1996, 8, 1616.
4. D. D. Lasic, Liposomes: *From Physics to Applications*, Plenum Press: New York, 1993; J. M. Schnur, *Science*, 1993, 262, 1669.
5. H. Bracht, S. P. Nichols, W. Walukiecwicz, J. P. Silveira, F. Briones, E. E. Haller, *Nature* 2000, 408.67.
6. A. G. MacDiarmid, *Angew. Chem., Rev. Mod. Phys.* 2001, 73, 701.
7. K. Doblhofer, K. Rajeshwar, *Handbook of Conducting Polymers*; Marcel Dekker: New York, 1998; chap. 20; D. Kumar R. C. Sharma, *Eur. Polm. J.* 1998, 40, 1053.
8. H. Shirakawa, *Angew. Chem.*, Int. Ed. 2001, 40, 2575; A. J. Heeger, *Angew. Chem.*, Int. Ed. 2001, 40, 2591; A. G. MacDiarmid, *Angew. Chem.*, Int. Ed. 2001, 40, 2581.
9. R. Singh, A. Lidha, *IEEE Trans. Semicond. Mater.* 2001, 14, 281; V. Saxena, B. D. Malhotra, Curr. *Appl. Phys.* 2003, 3, 293; H. He, J. Zhu, N. J. Tao, L. A. Nagahara, I. Amlani, R. Tsui, *J. Am. Chem. Soc.* 2001, 123, 7730; R. F. Service, *Science* 2001, 293, 782; J. Janata, M. Josowicz, *Nature Materials* 2003, 2, 19; D. T. McQuade, A. E. Pullen, T. M. Swager, *Chem. Rev.* 2000, 100, 2537; H. Q. Zhang, S. Boussaad, N. Ly, N. Tao, *J. Appl. Phys. Lett.* 2004, 84, 133.
10. W. S. Huang, B. D. Humphrey, A. G. MacDiarmid, *J. Chem. Soc. Faraday Trans.* 1986, 82, 2385.
11. B. Vincent, J. Waterson, *J. Chem. Soc. Chem. Commun.* 1990, 683; J. Stejskal, P. Kratochvil, S. P. Armes, S. F. Lascelles, A. Riede, M. Helmstedt, J. Prokes, I. Krivka, *Macromolecules* 1996, 29, 6814; C. Y. Yang, P. Smith, A. J. Heeger, Y. Cao, J. E. Osterholm, *Polymer* 1994, 36, 1142.
12. J. X. Huang, R. B. Kaner, *J. Am. Chem. Soc.* 2004, 126, 851; J. Kameoka, R. Orth, Y. N. Yang, D. Czaplewski, R. Mathers, G. W. Coates, H. G. Craighead, *Nanotechnology* 2003, 14, 1124; Z. X. Wei, M. X. Wan, T. Lin, L. M. Dai, *Adv. Mater.* 2003, 15, 136; Y. Long, Z. J. Chen, N. L. Wang, Y. J. Ma, Z. Zhang, L. J. Zhang, M. X. Wan, *Appl. Phys. Lett.* 2003, 83, 1863; A. L. Briseno, S. B. Han, I. E. Rauda, F. M. Zhou, C. S. Toh, E. J. Nemancik, N. S. Lewis, *Langmuir* 2004, 20, 219; J. Stejskal, P. Kratochv 1, S. P. Armes, S. F. Lascelles, A. Riede, M. Helmstedt, J. Prokes, I. Krivka, *Macromolecules* 1996, 29, 6814.
13. G. Li, C. Martinez, S. Semancik, *J. Am. Chem. Soc.* 2005, 127, 4903; E. S. Forzani, H. Zhang, L. A. Nagahara, I. Amlani, R. Tsui, N. Tao, *Nano Lett.* 2004, 4, 1785; Y. F. Ma, J. M. Zhang, G. J. Zhang, H. X. He, *J. Am. Chem. Soc.* 2004, 126, 709.
14. S. Virji, J. Huang, R. B. Kaner, B. H. Weiller, *Nano Lett.* 2004, 4, 491; J. Huang, S. Virji, B. H. Weiller, R. B. Kaner, *Chem. Eur. J.* 2004, 10, 1314; J. Huang, S. Virji, B. H. Weiller, R. B. Kaner, *J. Am. Chem. Soc.* 2003, 125, 314; H. Liu, J. Kameoka, D. A. Czaplewski, H. G. Craighead, *Nano Lett.* 2004, 4, 671.
15. A. Morrin, O. Ngamna, A. J. Killard, S. E. Moulton, M. R. Smyth, G. G. Wallace, *Electroanalysis,* 2005, 17, 423.
16. C. G. Wu, T. Bein, *Science* 1994, 264, 1757.
17. C. R. Martin, *Chem. Mater.* 1996, 8, 1739; R. V. Parthasarathy, C. R. Martin, *Chem. Mater.* 1994, 6, 1627.
18. C. W. Wang, Z. Wang, M. K. Li, H. L. Li, *Chem. Phys. Lett.* 2001, 341, 431.
19. J. C. Michaelson, A. J. McEvoy, *Chem. Commun.* 1994, 79.
20. H. J. Qiu, M. X. Wan, *J. Polym. Sci., Part A: Polym. Chem.* 2001, 39, 3485; Z. X. Wei, Z. M. Zhang, M. X. Wan, *Langmuir,* 2002, 18, 917; Y. S. Yang, M. X. Wang, *J. Mater. Chem.* 2002, 12, 897.
21. L. M. Huang, Z. B. Wang, H. T. Wang, X. L. Cheng, A Mitra, Y. X. Yan, *J. Mater. Chem.* 2002, 12, 388.
22. S. J. Choi, S. M. Park, *Adv. Mater.* 2000, 12, 1547.
23. J. M. Liu, S. C. Yang, *Chem, Commun.* 1991, 1529.
24. D. H. Reneker, I. Chun, *Nanotechnology,* 1996, 7, 216; A. G. MacDiarmid, W. E. Jones, I. D. Norris, J. Gao, A. T. Johnson, N. J. Pinto, J. Hones, B. Han, F. K. Ko, H. Okuzaki, M. Liaguno, *Synth. Met.* 2001, 119, 27.
25. H. X. He, C. Z. Li, N. J. Tao, *Appl. Phys. Lett.* 2001, 78, 811.
26. E. M. Scherr, A. G. MacDiarmid, S. K. Manohar, J. G. Masters, Y. Sun, X. Tang, M. A. Druy, P. J. Glatkowski, V. B. Cajibe, J. E. Fischer, K. R. Cromack, M. E. Jozefowicz, J. M. Ginder, R. P. McCall, A. J. Epstein, *Synth. Met.* 1991, 41, 735.
27. X. Zhang, W. J. Goux, S. K. Manohar, *J. Am. Chem. Soc.* 2004, 126, 4502; V. Gupta, N. Miura, *Electrochem. Commun.* 2005, 7, 995.
28. N. R. Chiou, A. J. Epstein, *Adv. Mater.* 2005, 17, 1679.

29. A. Morrin, F. Wilbeer, O. Ngamna, S. E. Moulton, A. J. Killard, G. G. Wallace, M. R. Smyth, *Electrochem. Commun.* 2005, 7, 317 and references therein.
30. D. Li, R. B. Kaner, *Chem. Commun.* 2005, 3286.
G. Springsteen, B. Wang, *Tetrahedron* 2004, 60, 11205.
32. B. A. Deore, I. Yu, M. S. Freund, *J. Am. Chem. Soc.* 2004, 126, 52.
33. B. A. Deore, M. S. Freund, *Analyst* 2003, 128, 803.
34. P. R. Westmark, L. S. Valencia, B. D. Smith, *J. Chromatogr., A* 1994, 664, 123; C. R. Cooper, N. Spencer, T. D. James, *Chem. Commun.*1998, 1365.
35. M. Nicolas, B. Fabre, G. Marchand, J. Simonet, *Eur. J. Org. Chem.* 2000, 9, 1703.
36. P. J. Domaille, J. D. Druliner, L. W. Grosser, J. M. Read Jr., E. R. Schmelzer, W. R. Stevens, *J. Org. Chem.* 1985, 50, 189.
37. S. Stafstrom, J. L. Breda, A. J. Epstein, H. S. Woo, D. B. Tanner, W. S. Huang, A. G. MacDiarmid, *Phys. Rev. Lett.* 1987, 59, 1464; F. Wudl, R. O. Angus, F. L. Lu, P. M. Allemand, D. J. Vachon, M. Nowak, Z. X. Liu, A. J. Heeger, *J. Am. Chem. Soc.* 1987, 109, 3677.
38. E. Shoji, M. S. Freund, *J. Am. Chem. Soc.* 2001, 123, 3383; E. Shoji, M. S. Freund, *J. Am. Chem. Soc.* 2001, 123, 12486; E. Shoji, M. S. Freund, *Langmuir* 2001 17, 7183.
39. B. A. Deore, I. Yu, P. M. Aguiar, C. Recksiedler, S. Kroeker, M. S. Freund, *Chem. Mater.* 2005, 17, 3803.
40. A. J. Epstein, R. P. McCall, J. M. Ginder, A. G. Macdiarmid, *In Spectroscopy of Advanced Materials*; John Wiley & Sons: New York, 1991.
41. G. Socrates, *Infrared Characteristic Group Frequencies. Tables and Charts,* 2nd ed.; John Wiley & Sons: New York, 1994.
42. D. H. Kim, B. N. Marbois, K. F. Faull, C. D. Eckhert, *J. Mass Spectrom.* 2003, 38, 632; D. H. Kim, K. F. Faull, A. J. Norris, C. D. Eckhert, *J. Mass Spectrom.* 2004, 39, 743.
43. O. Shnel, J. Garside, *Precipitation: Basic Principles and Industrial Applications*, Butterworth-Heinemann, Oxford, UK 1992. B. C. Bunker, P. C. Rieke, B. J. Tarasevich, A. A. Campbell, G. E. Gryxell, G. L. Graff, L. Song, J. Liu, J. W. Virden, G. L. McVay, *Science* 1994, 264, 48.
44. J. Huang, R. B. Kaner, *Nature Materials* 2004, 3, 783.

The invention claimed is:

1. A method for producing a polymer comprising:
reacting a fluoride and a monomer having a boronic acid moiety, or a salt thereof, in an acidic aqueous solution or in an aliphatic alcohol; and
polymerizing using an oxidizing agent;
wherein the monomer having a boronic acid moiety is a boronic acid substituted aniline, pyrrole or thiophene;
and wherein the fluoride is sodium fluoride, lithium fluoride, or potassium fluoride.

2. The method according to claim 1, further comprising purification of the polymer by centrifugation with 0.5 M HCl.

3. The method according to claim 1, further comprising dispersion of the polymer in a solvent.

4. The method according to claim 3, wherein the solvent is 0.1 M HCl, methanol, ethanol, 1-propanol, isopropanol, butanol, or octanol.

5. The method according to claim 1, wherein the monomer having boronic acid moiety is an aromatic boronic acid.

6. The method according to claim 1, wherein the boronic acid substituted aniline is 3-aminophenylboronic acid.

7. The method according to claim 1, wherein the oxidizing agent is ammonium persulfate, ferric chloride, potassium iodide, potassium dichromate, or potassium permanganate.

8. The method according to claim 1, wherein the aliphatic alcohol is methanol, ethanol, 1-propanol, isopropanol, butanol, or octanol.

9. The method according to claim 1, wherein the aqueous acid solution is 0.1 M HCl.

10. A polymer produced by the method of claim 1.

11. The polymer according to claim 10, which has morphology tunable by changing the solvent.

12. The polymer according to claim 11, wherein the morphology is a nanoparticle, a nanofilm, a nanofiber, or a globular agglomerate network comprised of globules and fibers.

13. The polymer according to claim 12, wherein the morphology is the nanoparticle, which has a particle size tunable by varying the rate of polymerization.

14. The polymer according to claim 12, wherein the morphology is the nanoparticle, which has a particle size in the range of from about 2 to about 100 nm.

15. The polymer according to claim 12, wherein the morphology is the globular agglomerate network, which has a particulate size in the range of from about 50 to 500 nm.

16. The polymer according to claim 12, wherein the morphology is the nanofiber, which has a diameter tunable by varying the reaction time.

17. The polymer according to claim 16, wherein the diameter is in the range of from 15 to 200 nm.

18. The polymer according to claim 16, wherein the nanofiber has a length in the range of from 400 nm to 5 μm.

* * * * *